United States Patent

Hall, III

[11] Patent Number: 5,509,491
[45] Date of Patent: Apr. 23, 1996

[54] DUAL-MOTOR ELECTRIC DRIVE SYSTEM FOR VEHICLES

[75] Inventor: Arthur Hall, III, Cicero, Ind.

[73] Assignee: General Motors Corporation, Detroit, Mich.

[21] Appl. No.: 229,032

[22] Filed: Apr. 18, 1994

[51] Int. Cl.$^6$ .............................. B62D 55/00; B60K 6/00
[52] U.S. Cl. .................. 180/9.44; 180/6.7; 180/6.44; 180/65.1; 180/65.7; 475/2; 475/5; 475/28; 475/151
[58] Field of Search .................. 180/6.2, 6.28, 180/6.62, 6.7, 6.44, 9.44, 65.1, 65.6, 65.7; 475/2, 5, 6, 18, 28, 153, 151

[56] References Cited

U.S. PATENT DOCUMENTS

| | | | |
|---|---|---|---|
| 2,305,373 | 12/1942 | Adamson | 74/661 |
| 3,799,284 | 3/1974 | Hender | 475/2 X |
| 4,090,415 | 5/1978 | Gorrell et al. | 475/276 |
| 4,270,622 | 6/1981 | Travis | 180/65.4 |
| 4,392,393 | 7/1983 | Montgomery | 74/661 |
| 4,685,354 | 8/1987 | McCabria | 475/5 |
| 4,803,897 | 2/1989 | Reed | 475/6 |
| 4,815,334 | 3/1989 | Lexen | 74/661 |
| 4,817,460 | 4/1989 | Reed | 475/6 |
| 5,168,946 | 12/1992 | Dorgan | 180/6.44 |
| 5,195,600 | 3/1993 | Dorgan | 180/6.2 X |

Primary Examiner—Margaret A. Focarino
Assistant Examiner—F. Zeender
Attorney, Agent, or Firm—Donald F. Scherer

[57] ABSTRACT

A dual-motor electric drive system is particularly suited for driving track-laying vehicles. The propulsion motors of the drive system are each individually selected to provide the speed and torque for selected portions of the operational requirements of the vehicle. The electric drive system utilizes a primary motor to provide the maximum speed requirements and a secondary motor to provide the high torque requirements for low speed operation. The primary and secondary propulsion motors are interconnected by a predetermined drive ratio so that the secondary motor provides torque until it attains a maximum predetermined speed whereupon it is disconnected from the primary motor.

13 Claims, 5 Drawing Sheets

DUAL-MOTOR ELECTRIC DRIVE SYSTEM FOR VEHICLES

TECHNICAL FIELD

The present invention relates generally to electric drive systems for vehicles. More particularly, the present invention relates to a dual-motor electric drive particularly suited for track-laying vehicles. Specifically, the present invention relates to an electric drive that employs two electric motors each having a power capacity that is less than the total requirement and which are selected to provide a predetermined segment of the overall torque and speed requirements for the track-laying vehicle.

BACKGROUND OF THE INVENTION

Proposals for driving military track vehicles by an electrical transmission commonly suggest the use of a single generator that powers two electric motors—one motor being operatively connected to the track on one side of the vehicle and the other motor being operatively connected to the track on the other side of the vehicle.

In such an arrangement, the electrical power to drive the vehicle would be provided by an on-board engine-generator combination. The electrical power provided by the engine-generator combination would be delivered to the motors which convert the electrical energy into rotary mechanical energy to drive the vehicle. Alternatively, such a drive system might use a single motor geared to each output. In either situation, the motor with its associated gearing, must be able to generate the maximum torque required of the vehicle and must also be able to drive the vehicle at the maximum output speed desired therefor. Although the power generating source is not required to provide sufficient power to drive the motor or motors at maximum speed with maximum torque, these parameters do define the size of the motor(s) required. Specifically, the product of the desired maximum speed and the required maximum torque defines the "Corner Horsepower" of the motor, and thus controls the size required.

When using a single motor to drive each track of a track-laying vehicle, the two motors are independently controlled such that the vehicle moves in a straight manner when the speeds of the motors are equal, and the vehicle is steered when the speeds of the two motors are independently varied. When using only a single motor to drive both tracks of the track-laying vehicle, the gearing by which the single motor is operatively connected to the two tracks must accommodate the independent speed control required to effect both straight line movement and the steering movement.

During a turn in either direction, one track becomes the inner track (relative to the turn), and the other track becomes the outer track. A major drawback of this arrangement is the requirement that the vehicle be capable of delivering full torque to either of its two tracks. This requires that either the single motor arrangement or the two-motor arrangement, and the attendant engine-generator be capable of providing maximum torque and maximum speed to each track. However, during most maneuvers of the vehicle, half the output need be delivered to each track so that whichever number of motors are employed, only half the rated capacity of the motors need be delivered to each track.

SUMMARY OF THE INVENTION

It is, therefore, a primary object of the present invention that an electric drive system be provided having motors that are selected to provide an even further reduction in their physical size and electrical capacities approaching an overall reduction of about 50%, while still providing the necessary power to meet and exceed the operational requirements (torque and speed) of a typical track-laying vehicle.

It is another object of the present invention to provide electric drive motors having electrical capacities that are individually selected to develop, or assist in the development of, the speed and torque required for particular segments of the overall operating range of the vehicle.

It is a further object of the present invention to provide an electric drive system having various embodiments that may be selected to replace prior art electric drive systems that use either a single electrical motor or multiple electric motors for supplying the power to drive the vehicle.

These and other objects of the invention, as well as the advantages thereof over existing and prior art forms, which will be apparent in view of the following detailed specification, are accomplished by means hereinafter described and claimed.

In general, an electric drive system embodying the concepts of the present invention utilizes at least two electric propulsion motors and provides two final drive outputs that are respectively interconnected to the left and right tracks of a track-laying vehicle. Each of the dual motors has an electrical capacity that is selected to provide a predetermined portion of the overall torque and speed required to propel and steer the vehicle. The dual electric motors, while providing all of the necessary torque and speed required for the vehicle, have a cumulative electrical capacity that is less than about half of the cumulative electrical capacity required by prior proposals for electric drive systems.

More particularly, the electrical capacity of a first or primary electric propulsion motor is selected to fulfill the high speed, low torque performance needs of the vehicle, whereas the electrical capacity of a second or secondary electric propulsion motor is selected to fulfill the low speed, high torque performance needs of the vehicle. The outputs of both motors are combined by a unique power distribution gearing arrangement when the second motor is interconnected during its predetermined portion of the overall operating range of the vehicle. The second motor is disconnected after a predetermined transitional speed has been attained, and with the high torque requirement for that speed falling within the capacity of the first propulsion motor.

As such, an electric drive system embodying the concepts of the present invention and particularly adapted for propelling track-laying vehicles through a low speed range to a desired maximum vehicle speed utilizes first and second electric propulsion motors. The first and second propulsion motors combine outputs to power both the left and right drive tracks of a track-laying vehicle. A final drive system is used to transfer propulsion forces from the unique power distribution gearing arrangement to the drive tracks.

A predetermined speed delineates the transition from the low speed range to the high speed range.

The first propulsion motor is operatively connected to the final drive system in order to provide the desired vehicle speed to its maximum range. A torque transfer device selectively disengages the second propulsion motor from the final drive system at approximately the transition speed. In one embodiment of the invention, the power distribution gearing arrangement between the first and second propulsion motors and the final drive assembly comprises a unique planetary gear set, and in another embodiment the power distribution gearing arrangement comprises spur gears.

A first power distribution ratio is provided between said first propulsion motor and said final drive system. The first power distribution ratio assures that the first propulsion motor reaches its maximum speed when the vehicle is at its maximum speed. A second power distribution ratio is provided between the second propulsion motor and the final drive system. The second power distribution ratio assures that the second propulsion motor reaches its maximum speed at approximately the transition speed, thereby effecting a multiplication of the output torque from the second propulsion motor to the final drive system. As such, a predetermined ratio is employed between the two propulsion motors.

To acquaint persons skilled in the arts most closely related to the present invention, one preferred embodiment of an electric drive system that illustrates a best mode now contemplated for putting the invention into practice is described herein by and with reference to the annexed drawings that form a part of the specification. The exemplary electric drive system is described in detail without attempting to show all of the various forms and modifications in which the invention might be embodied. As such, the embodiment shown and described herein is illustrative, and as will become apparent to those skilled in these arts can be modified in numerous ways within the spirit and scope of the invention; the invention being measured by the appended claims and not by the details of the specification.

DESCRIPTION OF AN EXEMPLARY EMBODIMENT

Figure 1:
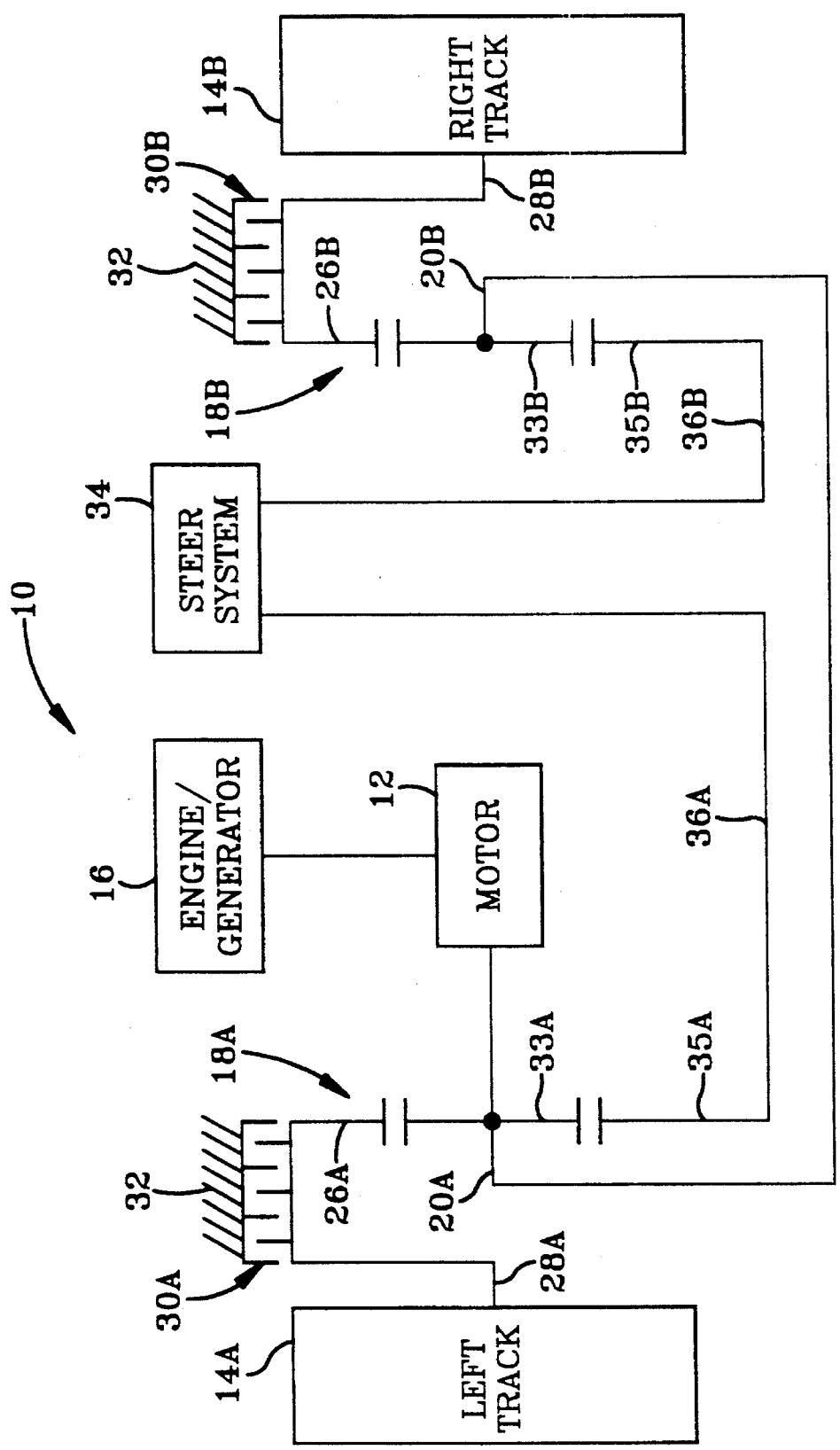
FIG. 1 is a diagrammatic representation of a prior art electric drive system employing a single electric motor to drive both a left and a right track of a track-laying vehicle.

FIG. 1 of the drawings depicts a prior art electric drive system 10 that will be briefly described in order to permit a more complete appreciation of the concepts of the present invention. The electric drive system 10 employs a single motor 12 for producing mechanical inputs to the left and right tracks 14A and 14B, respectively, of a track-laying vehicle, such as a military tank (not shown). The electric motor 12 draws electrical excitation from an on-board engine-generator 16 and supplies the power (speed multiplied by torque) to propel and steer the vehicle.

As previewed in the previous paragraph, and as will appear in the detailed description which follows, a particular structural member, component or arrangement may be employed at more than one location. When referring generally to that type of structural member, component or arrangement, a common numerical designation shall be employed. However, when one of the structural members, components or arrangements so identified is to be individually identified, it shall be referenced by virtue of a letter suffix employed in combination with the numerical designation employed for general identification of that structural member, component or arrangement. Thus, there are at least two tracks which are generally identified by the numeral 14, but the specific individual left and right tracks are, respectively, identified as 14A and 14B in the specification and on the drawings. This suffix convention shall be employed throughout the specification.

There will also be situations where a similar, though not identical, structural member, component or arrangement is employed at different locations. When referring generally to that type of structural member, component or arrangement, a common numerical designation shall also be employed, but in order to distinguish the nonidentical structural members, components or arrangements, a letter subscript shall be employed in combination with the numerical designation. That convention shall also be employed throughout the specification.

The motor 12 is operatively connected to a pair of planetary gear sets 18A and 18B associated with the respective left and right tracks 14A and 14B. The carriers 20A and 20B of the respective planetary gear sets 18A and 18B are conjoined for simultaneous rotation, as by a connecting shaft 22, and the output shaft 24 of the motor 12 drives the two carriers 20A and 20B.

The ring gear 26A in the first planetary gear set 18A (associated with the left track) drives the left drive shaft 28A—and thus the left track 14A—and the left system brake 30A selectively connects the ring gear 26A to ground 32. Similarly, the ring gear 26B in the second planetary gear set 18B (associated with the right track) drives the right drive shaft 28B—and thus the right track 14B—and the right system brake 30B selectively connects the ring gear 26B to ground 32. The ring gears 26A and 26B are operatively connected to the sun gears 32A and 32B in the planetary gear sets 18A and 18B by pinion gears 33A and 33B carried on the respective carriers 20A and 20B.

A conventional steer system 34 is employed, and because it is conventional, it need merely be reported that the steer system incorporates a steer motor and a conventional compound planetary gear set with the dual ring gears of which respectively provide the output torques to the sun gear 35A of the left output planetary gear set 18A, as through steering shaft 36A, and the output torques to the sun gear 35B of the right output planetary gear set 18B, as through steering shaft 36B. By the very nature of a two-ring compound planetary gear set which employs separate but intermeshing pinions, as are typically employed in steer systems such as that generically identified at 34, the ring gears in the compound planetary gear sets of the steering system 34—and thus the steering shafts 36A and 36B secured thereto—rotate in opposite directions. Hence, the input to the sun gear of the compound planetary gear set utilized in the steer system controls the relative rotation of the sun gears 35A and 35B in the respective left and right output planetary gear sets 18A and 18B, thereby effecting steerage of the vehicle.

The motor 12 is selected to generate the maximum torque required to drive the vehicle under anticipated conditions. That is, the motor 12 must be able to provide the maximum torque output at the minimum speed at which the vehicle is to perform as well as to provide the anticipated output torque at the maximum speed desired for the vehicle. These operating parameters—maximum speed and maximum torque— define the required size (physical dimensions and electrical capabilities or ratings) of the motor 12 and the engine-generator 16.

The physical size and electrical capacity or required rating for the motor and the engine-generator to provide the necessary operating power required by a specific vehicle utilizing the single motor 12 may be further described with reference to FIG. 2.

Figure 2:
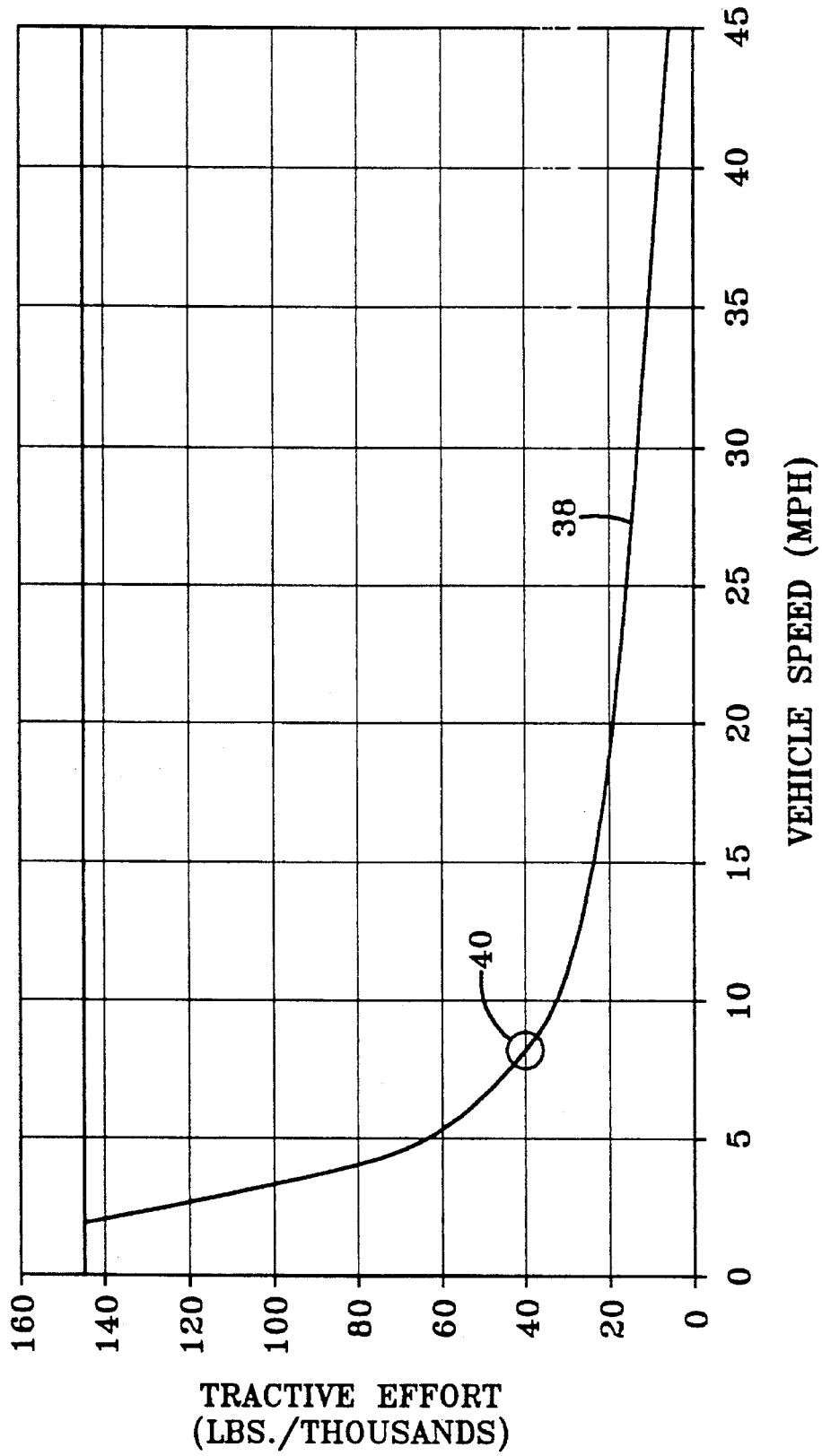
FIG. 2 is a graphical representation of the tractive effort curve for the prior art embodiment depicted in FIG. 1.

FIG. 2 comprises a plot of the tractive effort (designated in thousands of pounds along the Y-axis) against the speed of the vehicle (designated in miles per hour along the X-axis). FIG. 2 illustrates a typical tractive effort curve 38 required for the prior an electric drive system represented in FIG. 1 for driving a track-laying vehicle, such as a sixty (60) ton main-battle tank. The curve 38 also illustrates a zone 40 corresponding to the tractive effort of approximately 40,833 pounds needed to move the particular track-laying vehicle at a speed of 8.39 miles per hour up a terrain having an inclination corresponding to a thirty percent (30%) grade.

The tractive effort curve 38 also illustrates that the drive system 10 must be able to generate 144,000 pounds of tractive effort at the stall condition (maximum tractive effort at minimum speed) of the vehicle and yet be capable of attaining a maximum vehicle speed of 45 miles per hour at the minimum tractive effort contemplated. The tractive effort, vehicle speed and corner horsepower, each stated in their normal units—i.e.: tractive effort being stated in thousands of pounds, and speed being stated in miles per hour—have a mathematical relationship that may be expressed as:

$$\text{Corner Horsepower} = (\text{tractive effort}) \left( \frac{\text{speed}}{375} \right) \quad (1)$$

For the maximum values shown in FIG. 2—i.e.: a tractive effort of 144,000 pounds and vehicle speed of 45 miles per hour—the mathematical expression (1) yields 17,280 horsepower (HP) as the Corner Horsepower. The required combinations of the tractive effort and vehicle speed delineated as the required tractive effort curve 38 shown in FIG. 2 (between the two end points of maximum tractive effort and maximum speed, and including the 30% grade zone 40) define the performance required for operating a sixty (60) ton main-battle tank. The engine-generator set 16 supplying the motor 12 should have a rating of 1,500 net horsepower to provide the level of performance represented by the tractive effort curve 38 depicted in FIG. 2. The single motor (or the sum of individual sprocket motors used in place of the single motor in a manner to be generally described), not having the benefits of the present invention would have to be rated at a total of 17,280 corner horsepower to provide the required drive for the 60 ton main-battle tank.

This required corner horsepower is a function of both the torque required at the low end (reference the curve in FIG. 2 at about 2 mph along the X-axis) and a speed required at the high end (reference the curve in FIG. 2 at about 45 mph along the X-axis).

The region of FIG. 2 to the right and above the tractive effort curve 38 represents power demands that are not required to be met. Accordingly, neither the engine-generator set 16 nor the motor 12 needs to supply these power demands.

As further seen in FIG. 2, a great deal of capacity, represented by the tractive effort curve 38, of the motor 12 is only required for limited conditions—e.g.: the tractive effort needed during the slow speeds below about 9 mph. As such, the motor 12 is not effectively utilized. The present invention eliminates ineffectual utilization and thereby provides a significant reduction in the size of the motor required to operate the vehicle under consideration. The present invention not only reduces the physical size and weight of the one or more motors for an electrical drive system, but also reduces the electrical capacity required of the motors by a factor of at least fifty percent (50%), and such reduction may be further described with reference to FIG. 3.

Figure 3:
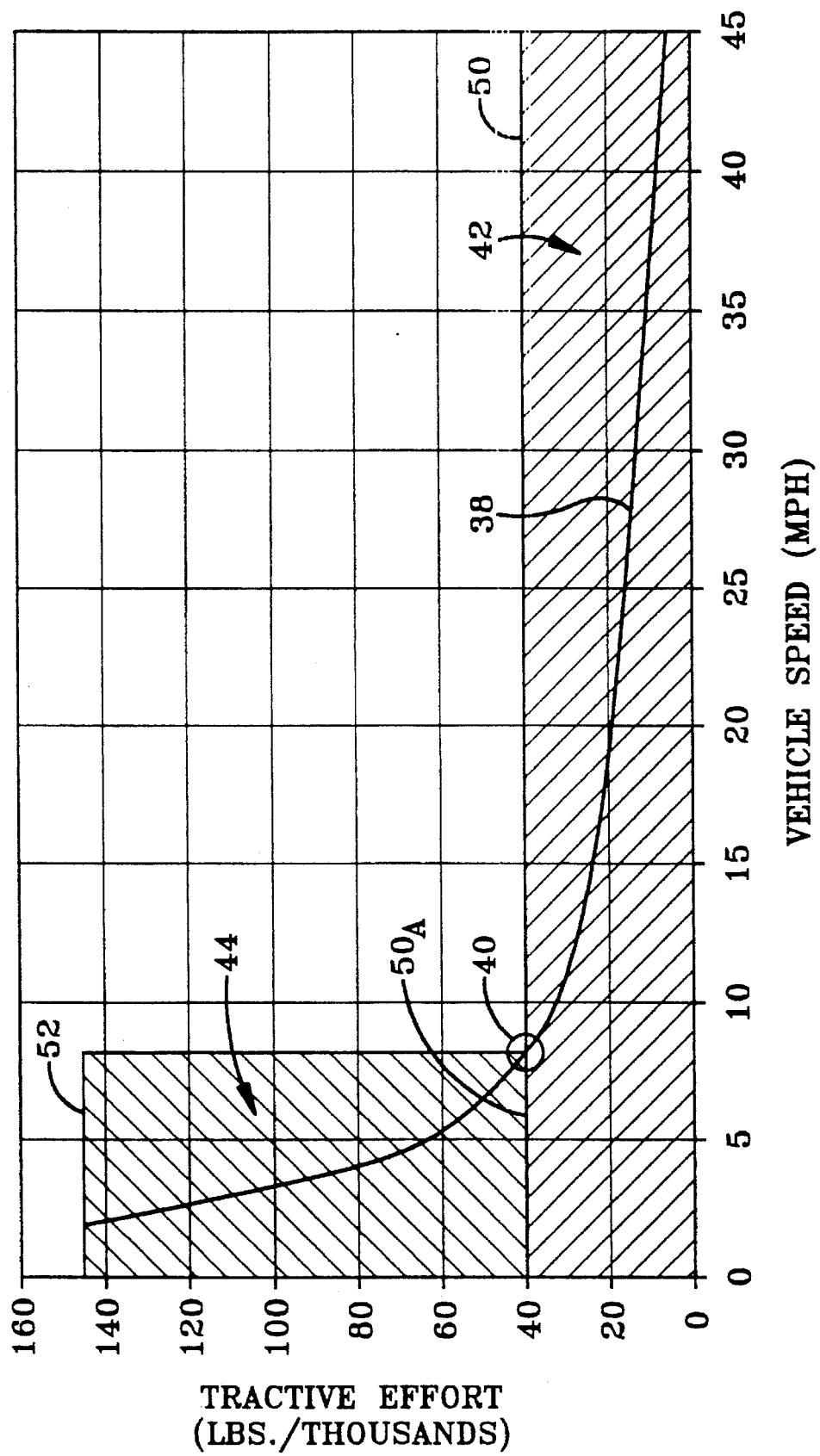
FIG. 3 is a graphical representation of the improved tractive effort curve for an electric drive system embodying the concepts of the present invention.

FIG. 3 has X and Y axes which are the same as those of FIG. 2. Further, FIG. 3 also illustrates the tractive effort curve 38 (which includes the 30% grade climbing zone 40). FIG. 3 further illustrates, in cross hatching, a first region 42, which represents the tractive effort and speed provided by the primary motor 46. Similarly, FIG. 3 also illustrates, in opposite cross hatching, a second region 44, which represents the tractive effort and speed provided by the secondary motor 48.

The primary motor 46 is selected to generate the tractive effort required to drive the 60 ton main-battle vehicle up a 30% grade at speeds in excess of about 8.39 mph and also to provide the tractive effort for the majority of the vehicle's operating requirements. Conversely, the secondary motor 48 is selected to provide the tractive effort, in excess of that required for the 30% grade, at speeds below about 8.39 mph.

As seen in FIG. 3, the upper bounds of the first region 42 is defined by an upper boundary line 50 corresponding to a tractive effort of about 40,833 pounds and has a portion $50_A$ that defines the lower boundary of second region 44. The second region 44 has an upper boundary defined by a second boundary line 52 corresponding to a tractive effort of 144,000 pounds. Using expression (1), it may be estimated that the corner horsepower provided by the primary motor 46 is 4,900 HP.

$$\text{Corner horsepower} = (40,833) \left( \frac{45}{375} \right)$$

Using the same expression (1), it may be shown that the corner horsepower provided by the secondary motor 48 is 2,310 HP.

$$\text{Corner horsepower} = (144,00 - 40,833) \left( \frac{8.39}{375} \right)$$

The 4,900 corner horsepower provided by the primary motor 46 represents 28.4% of that of the single motor 12 utilized in the prior art arrangement that is required to supply a corner horsepower equal to 17,280 HP, whereas the 2,310 corner horsepower provided by the secondary motor 48 represents 13.4% of that of the single motor 12 utilized by the prior art arrangement that is required to supply a corner horsepower equal to 17,280 HP. The cumulative corner horsepower of motors 46 and 48, required when using the present invention, is only about 41.8% (28.4%+13.4%) of that required by the single motor 12 in the prior art arrangement. As such, the present invention provides greater than a 50% reduction to the motor capacity requirement.

The propulsion motors 46 and 48 are powered by at least one engine-generator 66. The primary propulsion motor 46 is, as will be described, used to provide maximum vehicle speed, and the secondary motor 48 is used to provide high torque. The motors 46 and 48, respectively, drive the first and second sun gears $68_A$ and $68_B$ of a compound planetary gear set 70. Stepped planet gears 72 are rotatably mounted on a common carrier 74 that is, itself, grounded, as at 76. As such, the sun gear $68_A$ meshes with teeth $78_A$ on the stepped planet gears 72, and sun gear $68_B$ meshes with teeth $78_B$ on each stepped planet gear 72. Only teeth $78_A$ on each stepped planet gear 72 mesh with the ring gear 80. The relative number of teeth on the sun gears 68A and 68B determine the relative speed ratio at which motors 46 and 48 rotate. Hence, the ring gear 80 rotates at a fixed rate with respect to the motor 46 and at a second fixed rate with respect to motor 48. The ratio of the teeth on the two sun gears 68 determines the transition speed. Hence, in the situation where the maximum speed is approximately 45 mph and the transition speed is approximately 8.39 mph, the ratio of the teeth on the sun gears 68 is approximately 5.36:1.

The ring gear 80 is secured to the carrier 82 of the left output planetary gear set 84. The planet gears 86—which are rotatably supported on carrier 82—also meshingly engage a sun gear 88 and a ring gear 90 in the left differential output planetary gear set 84. The ring gear 90 drives the left output shaft 92—and thus the left track 94A—and the left system brake 96 selectively connects the ring gear 90 to ground 76.

The carrier 98 in the right output planetary gear set 100 is fixed to the carrier 82 in the left output planetary gear set 84, as by a shaft 102.

The planet gears 104 rotatably mounted on the carrier 98 matingly engage the sun gear 106 and ring gear 108 of the right differential output planetary gear set 100. The ring gear 108 drives the right output shaft 110, and the right system brake 112 similarly connects the ring gear 108 to ground 76.

A conventional steer system 114 is employed, and because it is conventional, it need merely be reported that the steer system incorporates a steer motor and a conventional compound planetary gear set with the dual ring gears of which respectively provide the output torques to the sun gear 88 of the left output planetary gear set 84, as through shaft 116, and the output torques to the sun gear 106 of the right output planetary gear set 100, as through shaft 118. By the very nature of a two-ring compound planetary gear set which employs separate but intermeshing pinions as are typically employed in steer systems such as that generically identified at 114, the ring gears in the compound planetary gear set of the steering system 114—and thus the shafts 116 and 118 secured thereto—rotate in opposite directions. Hence, the input to the sun gear of the compound planetary gear set utilized in the steer system controls the relative rotation of the sun gears 88 and 106 in the left and right output planetary gear sets 84 and 100, thereby effecting steerage of the vehicle.

As is also depicted, the output of the propulsion motor 48 is connected to sun gear $68_B$ through a one-way torque transfer device in the nature of a clutch 120.

The output planetary gears sets 84 and 100 together with the steer system 114 can, for convenience, be identified as the final drive.

Government specifications require that a vehicle have a tractive effort in excess of that required for a thirty percent (30%) grade at speeds below 8.39 miles per hour. The secondary motor 48 is geared such that it reaches its maximum speed at 8.39 miles per hour. As such, the secondary motor 48 can add its multiplied torque to that of the primary motor 46 at all speeds before 8.39 miles per hour. This is accomplished by virtue of the dual-input/single-output provided by the carrier-grounded, stepped-planet, compound, planetary gear set 70. At speeds above 8.39 miles per hour, the secondary motor 48 is mechanically disconnected from the dual-input/single-output planetary gear set 70, as through the one-way clutch 120.

The secondary motor 48 need develop only 2,310 corner horsepower to achieve the required 144,000 pound tractive effort with the sum of the primary motor torque and the multiplied secondary motor torque. Inasmuch as motor size is a direct function of corner horsepower, the combined primary and secondary motors need only be forty-two percent (42%) of the motor used in a comparable single motor system.

In summary, the improved electric drive system 60 embodying the concept of the present invention replaces the single motor 12 used in the prior art system 10 with two motors 46 and 48 that are mated through a unique carrier-grounded, stepped-planet, compound, planetary gear set 70. The primary motor 46 is geared to reach its maximum speed when the vehicle is driven at its maximum predetermined speed (e.g., 45 mph), whereas the secondary motor 48 is geared to reach its maximum speed when the vehicle is driven at a preselected low speed (e.g.: 8.39 mph). Therefore, the primary motor 46 is continuously driving the left and right tracks 94A and 94B, whereas the secondary motor 48 selectively contributes a driving force to the left and right tracks 94A and 94B at speeds up to the preselected low speed 8.39 mph.

The secondary motor 48 is geared lower than the primary motor 46. This gearing—which may be provided by planetary gears, as shown in the preferred embodiment, but which may also be provided by spur gears, as shown in the alternative embodiment—causes the secondary motor 48 to reach its maximum speed at much less than the maximum speed of the vehicle and multiplies its output torque several times before delivering it to the vehicle outputs (left and right tracks). Because the secondary motor 48 is only used when it is required to generate high tractive efforts at low vehicle speeds (i.e., below 8.39 mph), the total capacity of the two motors 46 and 48 closely matches the vehicle requirements, while still substantially reducing the necessity to oversize of one or the other of the motors for the electric drive system of the vehicle.

Figure 4:
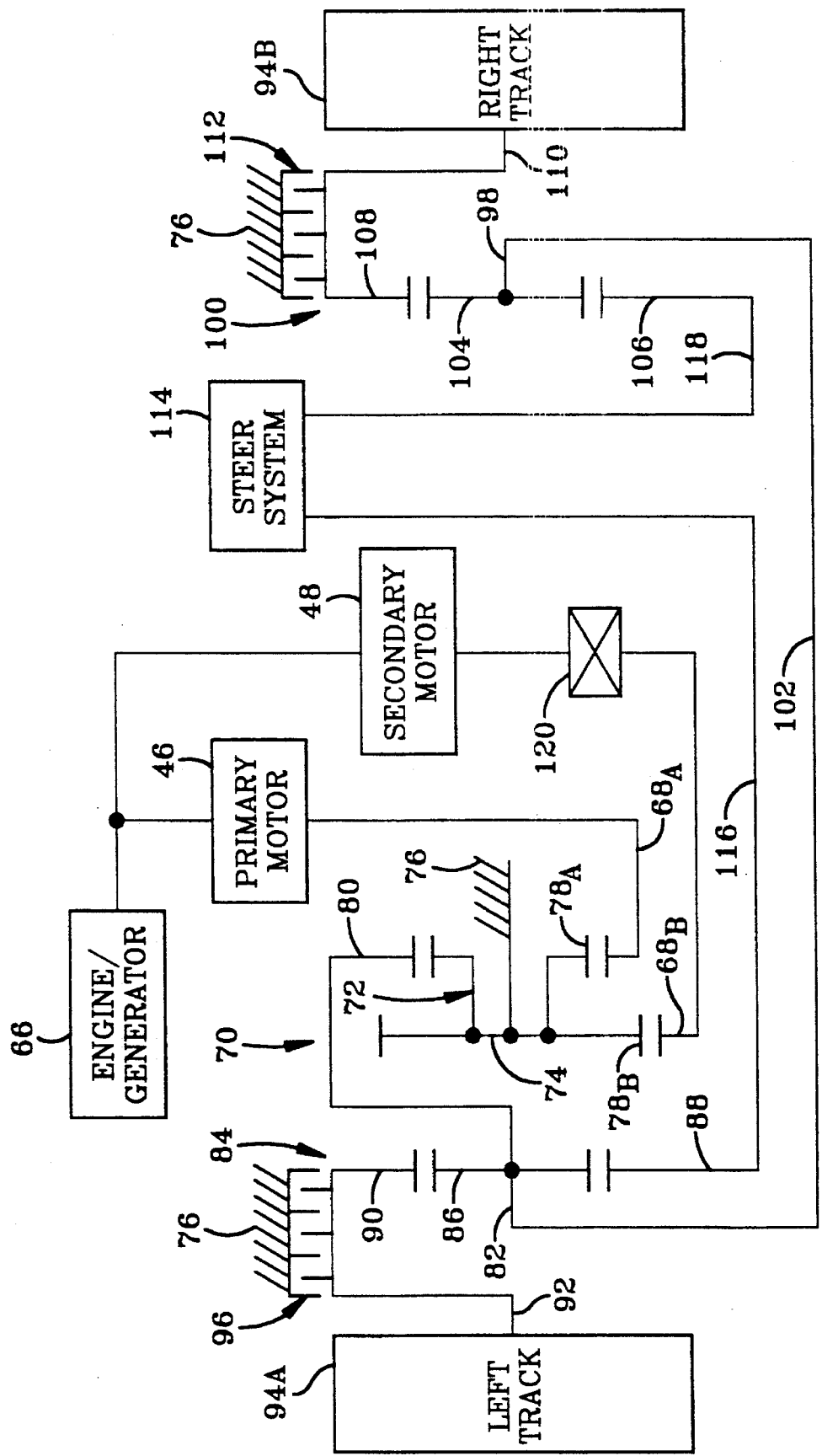
FIG. 4 is a diagrammatic representation of one embodiment of the present invention; and, FIG. 5 is a diagrammatic representation of a second embodiment of the present invention.

Furthermore, because the secondary motor 48 is geared to reach its maximum speed at 8.39 mph, its multiplied torque is added to that of the primary motor 46 at all speeds below 8.39 mph. At speeds above 8.39 mph, the secondary motor 48 is mechanically disconnected from the unique carrier-grounded, stepped-planet, compound, planetary gear set 70. The first embodiment of the present invention that uses the primary and secondary motors have now been described in detail with reference to FIG. 4.

It should now be appreciated that the practice of the present invention provides for an electric drive system having a primary and a secondary motor for providing the power (torque and speed) to drive a military vehicle, such as a track laying vehicle. The present invention, shown in the arrangement of FIG. 3, provides all the necessary torque and speed to drive such a vehicle, but does so in such a manner that the total electrical capacity of the dual-motor set (primary and secondary motors) is less than 50% of the prior art electrical drive system of FIG. 1.

A second embodiment of the present invention—identified generally by the numeral 130—may be described with reference to FIG. 5. The alternative second embodiment 130 utilizes a plurality of spur gears— which are hereinafter described in detail—that operatively connect a pair of propulsion motors 132 and 134 to the final drive system, designated generally at 136.

The final drive system 136 includes the steer arrangement and the differential output to the left and right tracks 138A and 138B, respectively. The steer and differential output components are well known to the art, and were described in sufficient detail in conjunction with the first of the exemplary embodiments, that a further description is not warranted.

Figure 5:
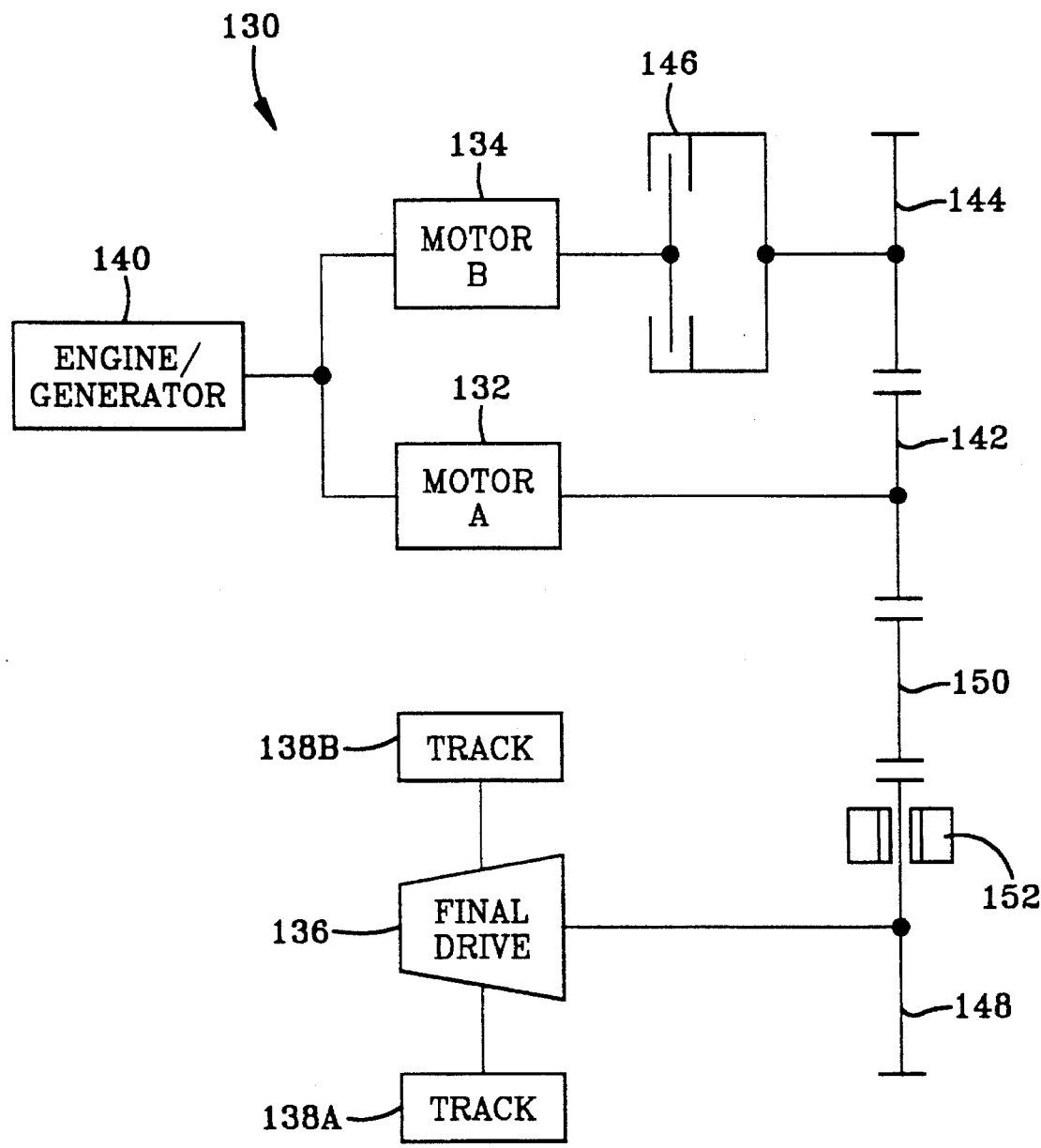

With continued reference to FIG. 5, the propulsion motors 132 and 134 are powered by at least one on-board engine-generator set 140. In this alternative embodiment, as well, the primary propulsion motor 132 is used to provide maximum vehicle speed, and the secondary motor 134 is used to provide high torque up to a transition speed. The primary propulsion motor 132 drives a spur gear 142. The secondary propulsion motor 134 also drives a spur gear 144, but through a selectively engageable torque transfer device, such as a friction clutch 146 or a one-way clutch, as disclosed at 120 in the previously described embodiment. The clutch 146 may be pneumatically, electrically or hydraulically operated. In fact, the clutch 146 may well incorporate a centrifugally operated device to effect the desired engagement and disengagement between the secondary propulsion motor 134 and the spur gear 144 at the transition speed.

The spur gears 142 and 144 meshingly engage with each other, and the spur gear 142 presented from the primary propulsion motor 132 operatively drives the output spur gear 148 presented from the final drive system 136. As shown, and in order to provide the desired spacial separation and/or to impart the desired rotational direction to spur gear 148, an idler gear 150 may be interposed between the spur gears 142 and 148.

Finally, a system brake 152 may operatively engage the output spur gear 150.

Hence, in the alternative embodiment depicted in FIG. 5, the primary propulsion motor 132 provides the speed and output torque to assure operation along the tractive effort curve 38 (FIG. 3) within region 42 by engagement of spur gear 142 to the output spur gear 148, as through an idler gear 150. The spur gear 144 presented from the secondary propulsion motor 134 engages spur gear 142 and assists in providing a driving engagement until the transition speed. As such, the secondary propulsion motor 134 is geared lower than the primary propulsion motor 132, which causes the secondary propulsion motor 134 to reach its maximum speed at about the transition speed and at the same time multiplies its output torque to assist the primary propulsion motor 132 such that the combined effort of the motors 132 and 134 provide the speed and torque to assure operation along the tractive effort curve 38 within region 44 depicted in FIG. 3.

As such, the ratio of the teeth on the spur gears 142 and 144 can be preselected to effect an operation which results in the tractive effort curve depicted in FIG. 3, and described previously herein to satisfy the governmental specifications for a representative track-laying vehicle, as exemplified by a 60 ton main-battle tank. Thus, to provide the operational characteristics depicted in FIG. 3, a tooth ratio of approximately 5.36:1 between the two spur gears 142 and 144 would be employed.

It should now be appreciated that the practice of the present invention also provides for an electric drive system having two motors for driving the left and right tracks of a track-laying vehicle. Even though two motors are used, the total corner horsepower of the two motors is less than 50% of that required for the single motor used in the arrangement of FIG. 1. Moreover, the two motors provide the necessary torque and speed needed for operating the same vehicle. In addition, it should now be apparent that the practice of the present invention not only teaches the effective use of dual-motor electric drive systems for track-laying vehicles, such as military tanks, but also teaches that the other objects of the present invention can also be achieved.

The embodiments of the invention in which an exclusive property or privilege is claimed are defined as follows:

1. An electric drive system for propelling a track-laying vehicle through both a low speed range and a high speed range to a desired maximum vehicle speed, said drive system comprising:

first and second electric propulsion motors capable of delivering independent propulsion forces;

said first and second electric propulsion motors each having a maximum speed;

left and right drive tracks;

a final drive system for transferring propulsion forces to the drive tracks;

a predetermined transition speed less than the maximum vehicle speed delineating the transition from the low speed range to the high speed range of the vehicle;

a first drive ratio is provided between said first propulsion motor and said final drive system;

said first drive ratio assures that said first propulsion motor reaches its maximum speed when said vehicle is at its maximum speed;

a second drive ratio is provided between said second propulsion motor and said final drive system;

said second drive ratio assures that said second propulsion motor reaches its maximum speed at approximately said transition speed;

the relationship of said first and second drive ratios effecting multiplication of the output torque from said second propulsion motor to said final drive system at speeds lower than said transition speed;

said first propulsion motor operatively connected to said final drive system to provide the desired maximum vehicle speed; and, means to engage said second propulsion motor to said final drive system to provide the output torque from said second propulsion motor to said final drive when torque in addition to that supplied by said first propulsion motor is required at speeds below said transition speed;

means to disengage said second propulsion motor from said final drive system at said transition speed when the output torque from said first propulsion motor is sufficient for said final drive system to propel the vehicle in the high speed range.

2. An electric drive system, as set forth in claim 1, wherein:

a gear step ratio between said first and second drive ratios is approximately 5.36:1.

3. An electric drive system, as set forth in claim 1, wherein:

said maximum speed for said first propulsion motor is approximately 45 mph.

4. An electric drive system, as set forth in claim 1, wherein:

maximum tractive effort supplied by said first propulsion motor is approximately 40,833 pounds.

5. An electric drive system, as set forth in claim 1, wherein:

said maximum speed for said second propulsion motor is approximately 8.39 mph.

6. An electric drive system, as set forth in claim 1, wherein:

tractive effort supplied by said second motor is approximately 103,167 pounds.

7. An electric drive system, as set forth in claim 1, wherein:

a gear step ratio between said first and second propulsion motors is approximately 5.36:1.

8. An electric drive system, as set forth in claim 1, wherein:

said first and second drive ratios are determined by a planetary gear set interposed between said first and second propulsion motors and said final drive system.

9. An electric drive system, as set forth in claim 8, wherein said planetary gear set that determines said first and second drive ratios comprises:

first and second sun gears;

a carrier;

said carrier being grounded;

a plurality of stepped planet gears mounted on said grounded carrier;

each said planet gear having a first and a second set of teeth;

said first set of teeth on each said stepped planet gear meshingly engaging said first sun gear;

said second set of teeth on each said stepped planet gear meshingly engaging said second sun gear;

a single ring gear;

said ring gear meshing with said first set of teeth on said stepped planet gears; and, said ring gear operatively connected to said final drive system.

10. An electric drive system, as set forth in claim 9, wherein:

a gear tooth ratio between said first and second sun gears is approximately 5.36:1.

11. An electric drive system, as set forth in claim 1, wherein:

said first and second drive ratios are determined by spur gears presented from said first and second propulsion motors and interposed between said propulsion motors and said final drive system.

12. An electric drive system, as set forth in claim 11, wherein:

a first spur gear is presented from said first propulsion motor;

a second spur gear is presented from said second propulsion motor;

said first and second spur gears are meshingly engaged;

said first spur gear is meshingly engaged to operate said final drive system; and, said means to disengage said second propulsion motor from said final drive system is disposed between said second propulsion motor and said second spur gear.

13. An electric drive system, as set forth in claim 12, wherein:

a gear step ratio between said first and second spur gears determines the relative speed range between said first and second propulsion motors is approximately 5.36:1.

* * * * *